United States Patent Office 3,408,372
Patented Oct. 29, 1968

3,408,372
PREPARATION OF 3-KETO-10β-METHYL-11β-HYDROXY-Δ⁴ STEROIDS
John H. Fried, Palo Alto, Calif., assignor to Syntex Corporation, Panama, Panama, a corporation of Panama
No Drawing. Continuation-in-part of application Ser. No. 533,877, Mar. 14, 1966. This application Feb. 20, 1967, Ser. No. 617,034
11 Claims. (Cl. 260—397.45)

ABSTRACT OF THE DISCLOSURE

Process of preparing a 3-keto-10β-methyl-11β-hydroxy-Δ⁴ steroid having anabolic and progestational activities comprising oxidation of the corresponding 11α-hydroxy ring A aromatic steroid to the 11-keto ring A aromatic steroid, reduction, ring A dearomatization, and acid hydrolysis to the 3-keto-11β-hydroxy-Δ⁵⁽¹⁰⁾-19-nor steroid, and direct methylation to the 3-keto-10β-methyl-11β-hydroxy-Δ⁴ steroid. The previous process including preparing the 11α-hydroxy ring A aromatic steroid from the corresponding Δ¹,³,⁵⁽¹⁰⁾,⁹⁽¹¹⁾-tetraene. Process of improved oxidation of an 11α-hydroxy ring A aromatic steroid to the corresponding 11-keto ring A aromatic steroid intermediates. Process of direct methylation of a 3-keto-11β-hydroxy-Δ⁵⁽¹⁰⁾-19-nor steroid to the corresponding 3-keto-10β-methyl-11β-hydroxy-Δ⁴ steroid products.

---

This is a continuation-in-part of Ser. No. 533,877, filed Mar. 14, 1966.

This invention relates to novel processes for the preparation of steroids.

More particularly, this invention pertains to a novel method of converting ring A aromatic 13-alkyl steroids to 10β-methyl-11β-hydroxy-13-alkyl steroids, that is, 3-keto-Δ⁴-11β-hydroxyandrostenes and -pregnenes and 3-keto-Δ⁴-11β-hydroxy-18-alkylandrostenes and -pregnenes. The overall transformation hereof may be represented by the following equation in which only the relevant portion of the steroid nucleus is depicted:

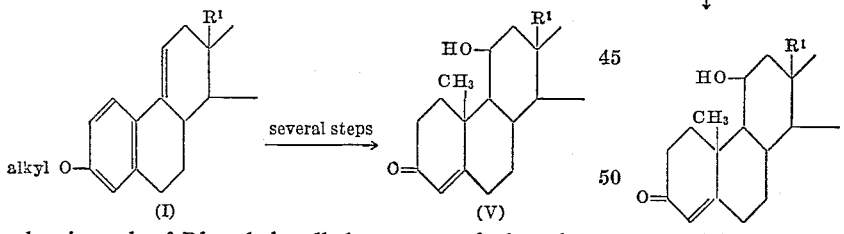

wherein each of R¹ and the alkyl group attached to the C-3 oxygen atom is a (lower)alkyl group, such as methyl, ethyl, propyl, butyl, and the like, particularly, methyl.

This invention is further directed at a novel process of oxidizing an 11α-hydroxyl ring A aromatic steroid to the corresponding 11-keto ring A aromatic steroid. Further, this invention is directed at a process for converting a 3-keto-11β-hydroxy-Δ⁵⁽¹⁰⁾-19-nor steroid directly to the corresponding 3-keto-10β-methyl-11β-hydroxy-Δ⁴ steroid, that is, a 3-keto-11β-hydroxy-Δ⁴-androstene or -pregnene.

The product steroids hereof (V) of the androstane and pregnane series, in addition to having anabolic and progestational activities, thus making them useful in the treatment of debilatory conditions and in the control of fertility, respectively, represent valuable intermediates for the preparation of other known steroidal compounds, such as the corresponding 17α-aliphatic-17β-ols, cortisone, prednisone, paramethasone, hydrocortisone, and various synthetic derivatives thereof, known to contribute significant physiological properties, via known procedures.

The starting steroids (I) depicted in the above transformation are either known or can be prepared via known procedures, such as that described by Smith et al., J. Chem. Soc. 1964, 4472 and Hughes et al., Steroids 8(6), 947 (1966) and the references cited therein.

Thus, a 3-methoxy-18-alkylestra-Δ¹,³,⁵⁽¹⁰⁾,⁹⁽¹¹⁾-tetraen-17-one starting compound once prepared can be reduced to the 17β-alcohol or otherwise elaborated prior to processing in accordance herewith. By following the procedures of Hughes et al. (supra) with a 3-methoxy-18-alkylestra-1,3,5(10),9(11) - tetraen - 17 - one, the corresponding 3-methoxy-18-alkyl-19-norpregna - 1,3,5(10),9(11)-tetraen-20β-ol is prepared via the Wittig 17-ethylidene intermediate.

The novel transformation set forth above may be further defined by the following reaction scheme in which, again, for convenience only partial formulas are depicted and R¹ has the same meaning as hereinbefore defined.

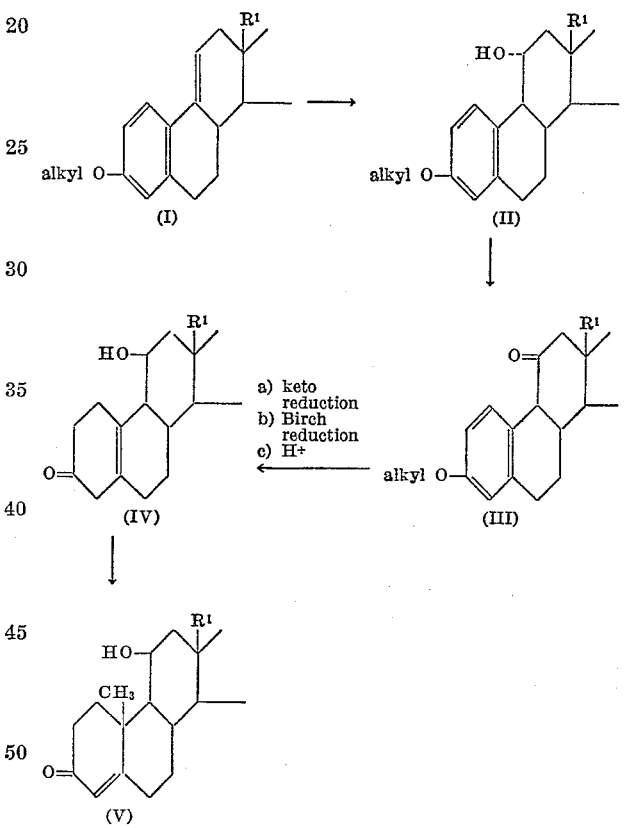

Referring to the immediately preceding scheme, the initial step of the present invention consists of hydroboration treatment of Δ¹,³,⁵⁽¹⁰⁾,⁹⁽¹¹⁾-unsaturated starting steroids (I) with diborane in, for example, tetrahydrofuran followed by mild oxidation with hydrogen peroxide in the presence of base, such as sodium hydride, to give the corresponding 11α-hydroxy compounds (II). In the pregnane series, the Wittig 17-ethylidene tetraene, when subjected to this hydroboration process, affords the corresponding 11α,20β-diol. A 17-keto group, if present in the starting compound, is reduced to the corresponding 17β-alcohol.

In one novel aspect of this invention, the 11α-hydroxy compopnd (II) is oxidized to the 11-keto compound (III), other hydroxyls present in the molecule, for example, at the 17β and 20β positions, being simultaneously oxidized. Heretofore, the oxidation of an 11α-hydroxy group of a ring A aromatic steroid, such as those represented by Formula II has been extremely difficult to realize via conditions known to the art, such as conventional chromic acid oxidation. Utilization of the novel oxidation process of Moffatt et al., U.S. Patent No. 3,248,380 with a hydrocarbon sulfoxide solvent, preferably dimethyl sulfoxide, a carbodiimide, notably an N,N'-dialkylcarbodiimide, and phosphoric acid or trifluoroaceticacid effects some limited oxidation of such compounds but with yields of less than 10%. Now it has been discovered that by utilizing the conditions of Moffatt et al., but employing dichloroacetic acid as an essential catalyst, 11α-hydroxy ring A aromatic steroids, such as those of Formula II, can be readily converted to 11-keto ring A aromatic steroids, such as those of Formula III, in high yields, for example, upwards of 80%.

While the particular use of dichloroacetic acid catalyst is critical versus the use of any of the acids specifically taught by Moffatt et al., the amount employed may vary considerably. A range of amounts of from about 0.01 to about 5 moles and, more particularly, from about 0.5 to about 1 mole of dichloroacetic acid per mole of the steroid being oxidized is satisfactory as herein contemplated.

After the novel oxidation process has been performed, reduction such as with lithium tri-t-butoxy-aluminum hydride in tetrahydrofuran yields the corresponding 11β-hydroxy ring A aromatic compound, any present keto groups being simultaneously reduced. This is subjected to a Birch reduction as with sodium and liquid ammonia in organic solvent to give the corresponding 3-alkoxy-$\Delta^{2,5(10)}$-diene which when treated with oxalic acid in the presence of acetone and methanol yields the 3-keto-11β-hydroxy-$\Delta^{5(10)}$-19-nor derivative (IV).

The conversion in the overall process of this invention of the thus prepared 3-keto-11β-hydroxy-$\Delta^{5(10)}$-19-nor compound (IV) to the corresponding 3-keto-10β-methyl-11β-hydroxy-$\Delta^4$ compound (V) itself constitutes another particularly valuable and novel process. This conversion has been heretofore accomplished via a process requiring two steps. The first of these formed the 3-keto-5β,10β-methylene-19-nor compound and the second accomplished the conversion of this to the product 3-keto-10β-methyl-11β-hydroxy-$\Delta^4$ compound. Now it has been discovered that it is possible to convert the 3-keto-11β-hydroxy-$\Delta^{5(10)}$-19-nor compounds directly to the corresponding 3-keto-10β-methyl-11β-hydroxy-$\Delta^4$ compounds (V), for example, 3-keto-11β-hydroxy-$\Delta^4$-androstenes and -pregnenes. Thus, by virtue of this novel process, the angular β-methyl group is directly introduced at position C–10 simultaneously with the migration of the double bond unsaturation from the $\Delta^{5(10)}$ position to the $\Delta^4$ position. The homoallytic hydroxyl system thus orients the methyl introduction cis with respect to the hydroxyl group.

In the practice of this aspect of the present invention, the 3-keto-11β-hydroxy-$\Delta^{5(10)}$-19-nor steroid (IV) is contacted with at least one molar equivalent and preferably a slight excess of an iodomethyl metal iodide, such as is provided by a combination of methylene iodide and metal couple, for example, zinc-copper, zinc-silver, chromium-copper, and the like, in a suitable non-aqueous solvent medium, preferably a hydrocarbon solvent having one or more ether functions in the molecule, such as ethyl ether, dioxane, tetrahydrofuran, the dimethyl ether of diethyleneglycol(diglyme), the dimethylether of triethyleneglycol(triglyme), and the like, from about five minutes to four hours reaction time or longer, preferably at about room temperature (20° C. to 25° C.) to directly afford in good yields the corresponding 3-keto-10β-methyl-11β-hydroxy-$\Delta^4$ compound (V). The product steroid is thereafter conventionally recovered from the reaction mixture, such as by chromatography, and the like.

Upon reaction end, any hydroxyl groups present in the molecule, other than the 11β-ol, can be oxidized to the corresponding keto function via mild oxidation procedures, such as with aluminum isopropoxide in organic solvent. The product compounds can thereafter be further elaborated at other positions of the molecule by following methods known per se.

The following examples illustrate the manner by which this invention may be practiced but they should not be construed as limitations upon the overall scope hereof except insofar as indicated by the appended claims.

EXAMPLE 1

To a stirred solution of 200 ml. of 1.25 M sodium borohydride in diglyme and 50 ml. of 1.7 M aluminum chloride in diglyme is slowly added with stirring 10.5 g. of 3-methoxyestra-1,3,5(10),9(11)-tetraen-17-one in 250 ml. of diglyme. The resultant solution is kept at room temperature for 30 minutes after which time it is cooled with ice water and added carefully to 40 ml. of pre-cooled aqueous potassium hydroxide (20%). A total of 15 ml. of hydrogen peroxide (30%) is then slowly added with vigorous stirring. The mixture is dissolved in an ether-water mixture and the ether layer is washed with dilute hydrochloric acid and water, dried over sodium sulfate, and evaporated to yield 3-methoxyestra-1,3,5(10)-triene-11α, 17β-diol.

EXAMPLE 2

To a solution of 12 g. of dicyclohexylcarbodiimide, 44 ml. of dimethylsulfide, 5 ml. of pyridine, and 1 ml. of dichloroacetic acid is added 3 g. of 3-methoxyestra-1,3,5(10)-triene-11α,17β-diol. The solution is water-cooled and left at room temperature for one hour after which time it is added to 100 ml. of chloroform containing 4 g. of oxalic acid and 10 ml. of methanol. This mixture is kept at room temperature for 30 minutes. The crystalline precipitate which has formed is filtered and the filtrate is washed with water and evaporated. The filtered precipitate is refluxed with methanol until no more dissolution occurs. The insoluble material is filtered and washed with methanol to give 3-methoxyestra-1,3,5(10)-triene-11,17-dione.

EXAMPLE 3

To a substantially anhydrous solution of 0.1 mmole of 3-methoxyestra-1,3,5(10)-triene-1α,17β-diol dissolved in 0.5 ml. of a mixture of dimethylsulfoxide and benzene in a volume ratio of 1:1 there were added 0.05 mmole of anhydrous dichloroacetic acid and five molar equivalents (relative to the amount of starting steroid) of N,N'-diisopropylcarbodiimide. After standing at room temperature for 22 hours, the reaction mixture is chromatographed to yield 3-methoxyestra-1,3,5(10)-triene-11,17-dione.

EXAMPLE 4

To a substantially anhydrous solution of 2 mmoles of N,N'-dicyclohexylcarbodiimide and 0.1 molar equivalent (relative to the amount of starting steroid) of dichloroacetic acid dissolved in 2 ml. of a mixture of dimethylsulfoxide and benzene (volume ratio of 3:7) is added 0.4 mmole of 3-methoxyestra-1,3,5,(10)-triene-11α,17β diol. This reaction mixture is then allowed to stand at room temperature for one hour at which point a 0.5 ml. aliquot portion is taken and chromatographed. Further aliquots are taken after 3 and 22 hours reaction time at room temperature and are similarly chromatographed. Upon comparison of the chromatographic separation, all three portions result in 3-methoxyestra-1,3,5(10)-triene-11,17-dione.

EXAMPLE 5

3-methoxyestra-1,3,5(10)-triene-11,17-dione (16 g.) is refluxed with 55 g. of lithium tri-t-butoxyaluminum hydride in 600 ml. of tetrahydrofuran for five hours. Thereafter, the solution is allowed to cool and is then poured into a water-chloroform mixture (1500 ml. water and 500 ml. chloroform) and 2 N hydrochloric acid is added to dissolve the precipitate present in the aqueous layer. The aqueous layer is re-extracted and the combined extracts are washed with water, dried over sodium sulfate, and evaporated. Crystallization of the residue from methanol gives 3-methoxyestra-1,3,5(10)-triene-11β,17β-diol.

Two grams of the product thus obtained is dissolved in a mixture comprising 30 ml. of tetrahydrofuran, 30 ml. of t-butanol, and 100 ml. of liquid ammonia. Four grams of sodium is next added portion-wise during a period of about 30 minutes and the resultant blue solution stirred for four hours. Ammonium chloride is added to discharge the blue color and the ammonia is allowed to evaporate. The residue is dissolved with a water-ether mixture and the aqueous layer is re-extracted with ether, the combined extracts are washed with water and evaporated to dryness. Crystallization of the residue from ethyl acetate in petroleum ether yields 3-methoxyestra-2,5(10)-diene-11β,17β-diol.

Two grams of the diene thus obtained is allowed to stand at room temperature in 20 ml. of acetone, 20 ml. of methanol, and 5 ml. of aqueous oxalic acid (10%). After 30 minutes, the mixture is poured into 100 ml. of water and extracted three times with 50 ml. of portions of chloroform. The combined extracts are dried over sodium sulfate and evaporated to dryness and the residue is crystallized from acetone-ether yielding estr-5(10)-ene-11β,17β-diol-3-one.

A mixture of g. of estr-5(10)-ene-11β,17β-diol-3-one, 4 ml. of pyridine, and 2 ml. of acetic anhydride is allowed to stand at room temperature for 15 hours. The mixture is then poured into ice water and the solid which forms is collected by filtration, washed with water, and dried to yield 17β-acetoxyestr-5(10)-en-11β-ol-3-one which may be further purified through recrystallization from acetone:hexane.

EXAMPLE 6

A mixture of 2 ml. of methylene iodide in 18 ml. of dry diethyl ether and 3 g. of zinc-copper couple are refluxed at room temperature for two hours after the addition of a crystal of iodine. Five-hundred milligrams of estr-5(10)-ene-11β,17β-diol-3-one in methylene iodide are added, the reaction is continued for another hour, and the reaction mixture is then poured into a mixture of 50 ml. of aqueous sodium carbonate (2%) and 50 ml. of ether. The resultant solution is shaken vigorously and the ether layer is dried over sodium sulfate and evaporated to give androst-4-ene-11β,17β-diol-3-one which may be further purified by recrystallization from ether-hexane.

Similarly, 17β-acetoxyandrost-4-en-11β-ol-3-one is prepared from 17β-acetoxyestr-5(10)-en-11β-ol-3-one.

EXAMPLE 7

A mixture of 0.8 ml. of methylene iodide, 650 mg. of zinc-copper couple, and 6 ml. of ethyl ether are refluxed for 40 minutes. The resultant mixture is filtered and the filtrate is added to a solution of 50 mg. of estr-5(10)-ene-11β,17β-diol-3-one in 20 ml. of ethyl ether. The mixture is maintained at room temperature for 30 minutes and thereafter the reaction mixture is diluted with ether, washed successively with a 10% ammonium chloride solution, a 5% sodium carbonate solution, and with water until neutral and is then dried over sodium sulfate and evaporated to dryness. The solid residue is chromatographed on neutral alumina, thus giving androst-4-ene-11β,17β-diol-3-one.

Similarly, 17β - acetoxyandrost - 4 - en-11β-ol-3-one is prepared.

EXAMPLE 8

The procedure of Example 7 is repeated, except that zinc-silver metal couple is substituted for zinc-copper couple, ethyl ether is substituted by tetrahydrofuran, and the reaction, after evaporation of solvent, is carried out for three hours at room temperature thus obtaining similar results.

The foregoing procedures are useful in the 18-alkyl series of steroids. Thus, by starting with 3-methoxy-18-methylestra-1,3,5(10),9(11)-tetraen-17-one, there is prepared as a product of Example 1, 3-methoxy-18-methylestra-1,3,5(10)-triene-11α,17β-diol; of each of Example 2, 3, and 4, 3-methoxy-18-methylestra-1,3,5(10)-triene-11,17-dione; of Example 5, 18-methylestr-5(10)-ene-11β,17-β-diol-3-one and 17β-acetoxy-18-methylestr-5(10)-en-11β-ol-3-one; and of Examples 6, 7 and 8, 18-methylandrost - 4 - ene - 11β,17β-diol-3-one and 17β-acetoxy-18-methylandrost - 4 - en-11β-ol-3-one. Likewise, the various other 18-alkylandrostenes hereof are prepared.

EXAMPLE 9

A solution of 0.75 g. of sodium hydride in 25 ml. of dimethylsulfoxide is stirred at 80° C. until the evolution of hydrogen ceases and is then cooled to room temperature. A solution of 12.5 g. of ethyl triphenylphosphonium bromide in 50 ml. of dimethylsulfoxide is then added to the resultant solution, followed by 1.5 g. of 3-methoxyestra-1,3,5(10),9(11)-tetraen-17-one in 30 ml. of benzene. The mixture is stirred under nitrogen at room temperature for three hours and then at 80° C. for 20 hours. After cooling, the mixture is poured into ice water and extracted with ether. After passing the oily product in benzene through a column of neutral alumina, it is crystallized from ether:hexane, the mother liquors being evaporated and the residue chromatographed on neutral alumina eluting with benzene giving 3-methoxy-19-norpregna-1,3,5(10),9(11), 17(20)-pentaene which is recrystallized from ethanol.

Similarly, from 3 - methoxy - 18-methylestra-1,3,5(10), 9(11), tetraen-17-one is prepared 3-methoxy-18-methyl-19 - norpregna - 1,3,5(10),9(11),17(20)-pentaene. The other 18-alkylpregnenes contemplated herein are also so prepared.

EXAMPLE 10

Upon subjecting 3 - methoxy - 19-norpregna-1,3,5(10), 9(11),17(20)-tetraene to the procedure set forth in Example 1, there is prepared 3-methoxy-19-norpregna-1,3,5(10)-triene-11α,20-diol; of Examples 2, 3, and 4, 3-methoxy - 19 - norpregna-1,3,5(10)-triene-11,20-dione; of Example 5, 19 - norpregn - 5(10)-ene-11β,20β-diol-3-one; and of Example 6, 7, and 8, pregn-4-ene-11β-20β-diol-3-one.

Likewise, the corresponding 18-methylpregn-4-ene-11β, 20β-diol-3-one is prepared from 3-methoxy-18-methyl-19-norpregna-1,3,5(10),9(11),17(20)-tetraene. The other 18-alkylpregnenes are similarly prepared.

A solution of 1 g. of pregn-4-ene-11β-20β-diol-3-one in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water 10% sodium carbonate solution, and again with water to neutrality, dried over anhydrous sodium sulfate, and evaporated to dryness to yield pregn-4-en-11β-ol-3,20-dione which may be further purified by recrystallization from acetone:hexane.

Similarly, the corresponding 18-alkylpregnenes are so oxidized. Thus, for example, 18-methylpregn-4-ene-11β-ol-3,20-dione is prepared.

What is claimed is:

1. The process of preparing a 3-keto-10β-methyl-11β-hydroxy-Δ⁴ steroid from an 11α-hydroxy ring A aromatic steroid which comprises oxidizing the 11α-hydroxy ring A aromatic steroid with a hydrocarbon sulfoxide and an N,N'-di(hydrocarbon substituted)-carbodiimide in the presence of dichloroacetic acid to the 11-keto ring A aromatic steroid, converting the 11-keto ring A aromatic steroid to a 3-keto-11β-hydroxy-Δ⁵⁽¹⁰⁾-19-nor steroid by reduction of the 11-keto group, ring A dearomatization and mild acid treatment, and treating the 3-keto-11β-hydroxy-Δ⁵⁽¹⁰⁾-19-nor steroid with an iodomethyl metal iodide thereby forming the 3-keto-10β-methyl-11β-hydroxy-Δ⁴ steroid directly.

2. The process of claim 1 wherein said 11α-hydroxy ring A aromatic steroid is an 11α-hydroxy-$\Delta^{1,3,5(10)}$-estratriene or an 11α-hydroxy-18-alkyl-$\Delta^{1,3,5(10)}$-estratriene, including the step of forming said 11α-hydroxy ring A aromatic steroid from a $\Delta^{1,3,5(10),9(11)}$-estratetraene or an 18-alkyl-$\Delta^{1,3,5(10),9(11)}$-estratetraene via hydroboration and treatment with hydrogen peroxide, the 3-keto-10β-methyl-11β-hydroxy-$\Delta^4$ steroid thus formed being 3-keto-11β-hydroxy-[13-alkyl]-$\Delta^4$ androstene or a 3-keto-11β-hydroxy-18-alkyl-$\Delta^4$-androstene.

3. The process of claim 1 wherein said 11α-hydroxy ring A aromatic steroid as an 11α-hydroxy-$\Delta^{1,3,5(10)}$-19-norpregnatriene or an 11α-hydroxy-18-alkyl-$\Delta^{1,3,5(10)}$-19-norpregnatriene, including the step of forming said 11α-hydroxy ring A aromatic steroid from a $\Delta^{1,3,5(10),9(11)}$-19-norpregnatetraene or an 18-alkyl-$\Delta^{1,3,5(10),9(11)}$-19-norpregnatetraene via hydroboration and treatment with hydrogen peroxide, the 3-keto-10β-methyl-11β-hydroxy-$\Delta^4$ steroid thus formed being a 3-keto-11β-hydroxy-$\Delta^4$-pregnene or a 3-keto-11β-hydroxy-18-alkyl-$\Delta^4$-pregnene.

4. In the process of oxidizing an 11α-hydroxy ring A aromatic steroid to an 11-keto ring A aromatic steroid with a hydrocarbon sulfoxide solvent, an N,N'-di(hydrocarbon substituted)-carbodiimide and an acid catalyst, the improvement which comprises utilizing dichloroacetic acid as the acid catalyst.

5. The process of claim 4 wherein said hydrocarbon sulfoxide is dimethylsulfoxide and said N,N-di(hydrocarbon substituted)-carbodiimide is N,N'-dicyclohexylcarbodiimide.

6. The process of claim 4 wherein 3-methoxyestra-1,3,5(10)-triene-11,17-dione is prepared from 3-methoxyestra-1,3,5(10)-triene-11α,17β-diol.

7. The process of claim 4 wherein 3-methoxy-19-norpregna-1,3,5(10)-triene-11,20-dione is prepared from 3 - methoxy - 19 - norpregna - 1,3,5(10) - triene - 11α, 20β-diol.

8. The process of preparing a 3-keto-10β-methyl-11β-hydroxy-$\Delta^4$ steroid directly from a 3-keto-11β-hydroxy-$\Delta^{5(10)}$-19-nor steroid which comprises treating said 3-keto-11β-hydroxy-$\Delta^{5(10)}$-19-nor steroid with an iodomethyl metal iodide in a non-aqueous solvent medium.

9. The process of claim 8 wherein the iodomethyl metal iodide is iodomethyl zinc iodide.

10. The process of claim 8 wherein a 3-keto-11β-hydroxy-$\Delta^4$-androstene or a 3-keto-11β-hydroxy-18-alkyl-$\Delta^4$-androstene is prepared from a 3-keto-11β-hydroxy-$\Delta^{5(10)}$-estrene or a 3-keto-11β-hydroxy-18-alkyl-$\Delta^{5(10)}$-estrene, respectively.

11. The process of claim 8 wherein a 3-keto-11β-hydroxy-$\Delta^4$-pregnene or a 3-keto-11β-hydroxy-18-alkyl-$\Delta^4$-pregnene is prepared from a 3-keto-11β-hydroxy-$\Delta^{5(10)}$-19-norpregnene or a 3-keto-11β-hydroxy-18-alkyl-$\Delta^{5(10)}$-19-norpregnene, respectively.

References Cited

UNITED STATES PATENTS 3,248,380    4/1966    Moffatt et al.

HENRY FRENCH, *Primary Examiner*.

Washington. D.C. 20231

UNITED STATES PATENT OFFICE
CERTIFICATE OF CORRECTION

Patent No. 3,408,372            October 29, 1968

John H. Fried

It is certified that error appears in the above identified patent and that said Letters Patent are hereby corrected as shown below:

Column 2, line 67, "compopnd" should read -- compound --. Column 4, line 40, "1α" should read -- 11α --. Column 5, line 23, after "mixture of" insert -- 1 --. Column 6, line 3, "17-β-diol" should read -- 17β-diol --; line 27, "(11)," should read -- (11)- --; lines 39 and 45, "11β-20β", each occurrence, should read -- 11β,20β --; line 54, "water" should read -- water, --. Column 7, line 9, cancel "[13-alkyl]-"; line 28, "N,N-" should read -- N,N'- --.

Signed and sealed this 10th day of March 1970.

(SEAL)
Attest:

Edward M. Fletcher, Jr.            WILLIAM E. SCHUYLER, JR.
Attesting Officer                    Commissioner of Patents